Figure 3:
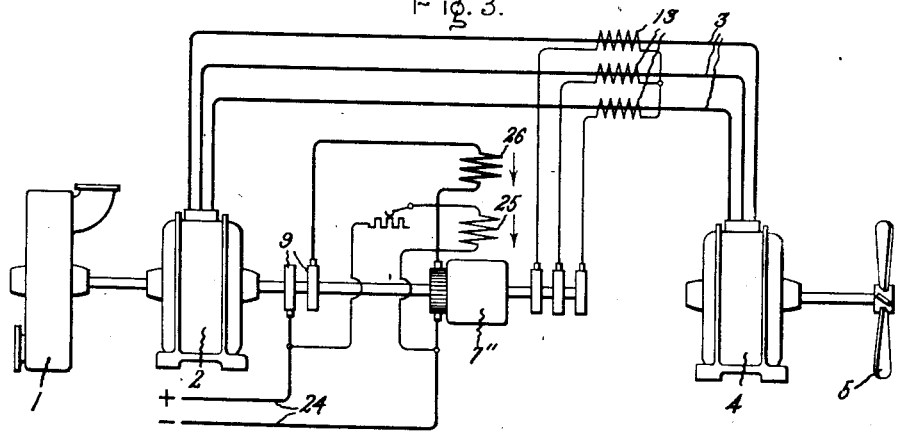

March 10. 1925.
C. MACMILLAN
1,529,318
ELECTRIC SHIP PROPULSION
Filed Sept. 23, 1921
2 Sheets-Sheet 1
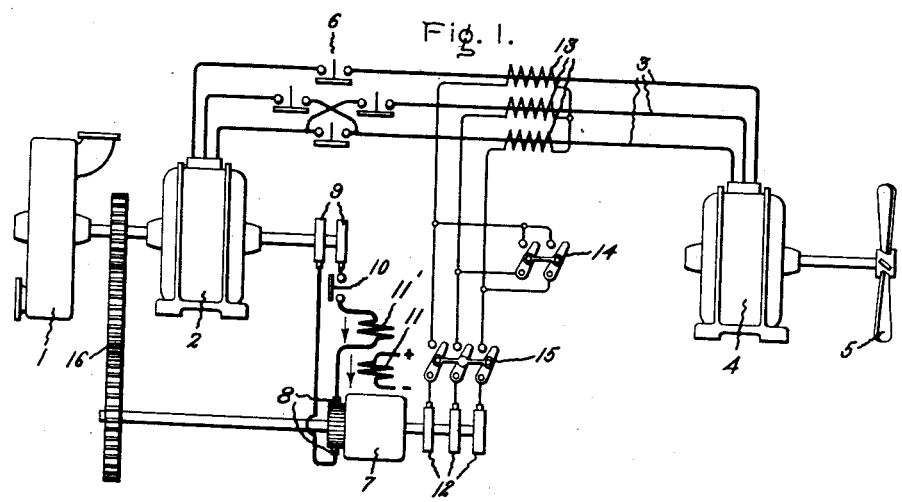
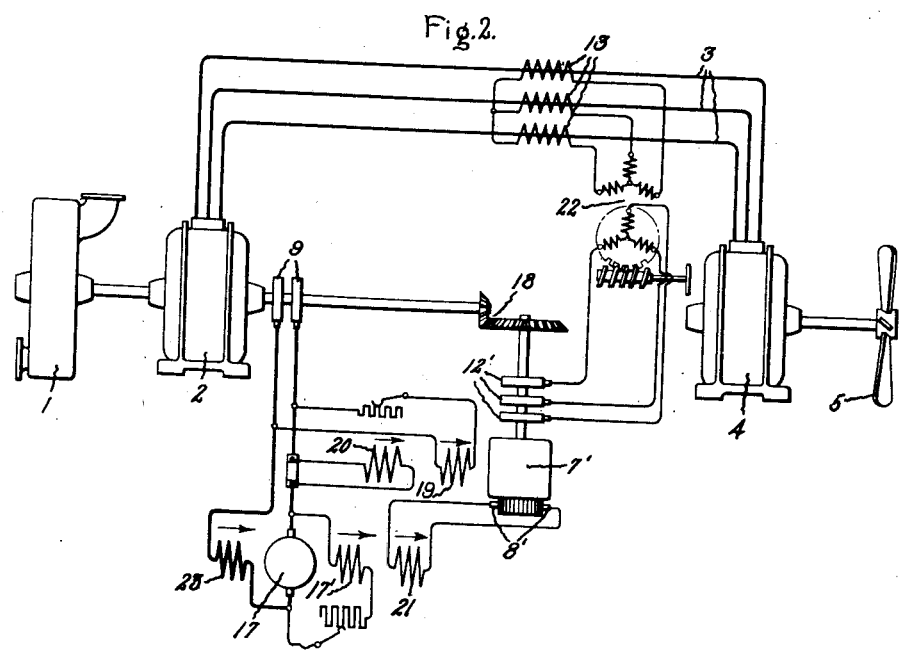
Inventor:
Campbell Macmillan,
by Albert G. Davis
His Attorney.

March 10. 1925.

C. MACMILLAN

ELECTRIC SHIP PROPULSION

Filed Sept. 23, 1921

1,529,318

2 Sheets-Sheet 2

Inventor:
Campbell Macmillan,
by
His Attorney.

Patented Mar. 10, 1925.

1,529,318

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC SHIP PROPULSION.

Application filed September 23, 1921. Serial No. 502,786.

*To all whom it may concern:*

Be it known that I, CAMPBELL MACMILLAN, a citizen of the United States, residing at Schenectady, in the county of Schenectady, State of New York, have invented certain new and useful Improvements in Electric Ship Propulsion, of which the following is a specification.

My invention relates to electric power systems in which an adjustable speed synchronous generator is arranged to supply a work motor driving a load which varies substantially as the cube of the speed and is particularly useful in electric ship propulsion systems wherein an induction or synchronous motor is arranged to drive the ship's propeller.

The capacity of a ship propulsion system is limited by the heating of the alternator field winding and in order to provide for a temporary increase of load on the electric equipment without increasing the size and weight of the equipment, it is desirable to vary the excitation to suit the conditions of the system. For heavy loads the excitation should be increased to prevent the motors from falling out of step and for light loads, to secure conditions favorable to efficiency, the excitation should be decreased to the minimum amount sufficient for stable operation of the motor or motors.

An object of my invention is to provide a simple arrangement for varying the excitation of a system of the class described in accordance with the main line current which shall provide a large overload capacity in the system and which shall not only operate approximately correctly for changes in load occurring at any given speed but also operate approximately correctly for changes in load due to changes in the speed and frequency of the generator. My invention will be better understood from the following description taken in connection with the accompanying drawings and its scope will be pointed out in the appended claims.

In the accompanying drawings Figs. 1, 2, 3 and 4 are diagrammatic representations of electric ship propulsion systems embodying my invention.

Referring to Fig. 1 the adjustable speed prime mover 1 for driving the synchronous generator 2 is represented as an elastic fluid turbine. Any suitable means may be provided for regulating and adjusting the speed of the turbine. An example of one such suitable means is shown in the patent to Emmett, No. 1,137,308, patented April 27, 1915. The generator 2 is connected through the mains 3 to supply the work motor 4 which may be either of the induction or synchronous type. The rotatable element of the motor 4 is represented as directly connected to a ship's propeller 5. Suitable circuit controlling and reversing switches 6 are provided in the mains 3 for controlling the direction of the operation of the motor 4. The exciting current for the generator 2 is applied from the machine 7 which is arranged to operate as a rotary converter, the direct current brushes 8 of which are connected to the slip rings 9 which lead exciting current into the field winding of the generator 2. A switch 10 may be provided to control the excitation circuit of the generator. The machine 7 is provided with a separately excited shunt winding 11 and a series winding 11'. The alternating current end of the machine 7 is connected through slip rings 12 to current transformers 13 in the mains 3 so that the current to the alternating end of the rotary varies in accordance with the current supplied from the generator 2 to the motor 4. A switch 14 may be provided to enable the current transformers 13 to be short circuited and a switch 15 may be provided for disconnecting the rotary converter from the transformers 13. In the embodiment of my invention illustrated in Fig. 1, the rotary converter is represented as positively driven from the shaft of the generator 2 as by means of reduction gearing 16 which maintains a fixed mechanical phase relationship between the armature of the rotary and the field element of the generator 2.

To set the system shown in Fig. 1 into operation the turbine 1 will be started up with the switches 10 and 15 open and the switch 14 closed. The switches 6 will then be operated for the desired direction of operation. Excitation will then be applied to the generator 2 as, for example, by closing the switch 10. The machine 7 will operate as a direct current exciter to build up the excitation in the generator field winding. Switch 14 will be opened and switch 15 closed practically simultaneously with the application of exciting current to the generator 2. The large current taken by the motor 4, which will preferably operate during this phase of operation as an induction motor, will cause the rotary converter 7 to apply over excitation to the generator field winding by reason of the fact that the current supplied to the rotary by the transformers 13 will vary directly in accordance with the current in the mains 3. When the motor has come up to speed the current will fall to normal value and the exciting current for the generator 2 will decrease correspondingly. The current delivered by the direct current brushes 8 of the rotary converter 7 will bear a substantially fixed relation to the current supplied by the current transformers 13 to the slip rings 12 of the converter. If the load on the propeller motor at any given speed and frequency of the generator is caused to change as, for example, by the pitching of the ship or a movement of the helm, the excitation of the generator will be proportionally increased to prevent the motor from falling out of step. In a ship propulsion system the speed of the ship is customarily varied by varying the speed of the prime mover driving the generator. If the speed of the generator is reduced, for example, to one-half normal speed, the load on the propeller driving motor will be reduced to one-eighth its former value while the torque required of the motor will be but one-quarter of its former value. The current supplied to the motor will be but one-half its former value and the voltage required to be delivered by the generator will be but one-quarter its former value. These conditions will be fulfilled if the exciting current to the generator is reduced to one-half its former value. The rotary converter 7 is reduced in speed in accordance with the speed reduction of the generator and, therefore, runs at one-half speed. The electromotive force established by the commutator is dependent upon the necessity of forcing one-half the former current through the main generator field winding, and it should, therefore, assume one-half its former value also. In order that this may take place the constant ac—dc ratio of the rotary converter establishes one-half the former voltage at the collector rings and in order that the current transformer may supply this value of voltage the primary and secondary currents readjust their phase relationship in such manner that their vector difference may furnish the proper value of magnetizing current. On account of the reactance of the rotary converter windings the voltage to be supplied to the collector rings of the rotary to furnish one-half voltage at the commutator will be somewhat greater than one-half unless the excitation of the rotary field winding is especially arranged to adjust itself to produce a compensating effect.

The current taken by the collector rings will also include some lagging or leading current over and above the value corresponding to the value of the dc current taken from the commutator. For any given load and speed of the main equipment a value of rotary field excitation can be selected such that the lagging or leading current is reduced practically to zero. A corresponding compensating effect upon the lost reactive volts of the rotary can be obtained or, by combining the two effects, a suitable amount of excitation of the rotary enables it to furnish all the wattless volt amperes required for its own operation and further excitation enables it to contribute to correction of phase displacement in the current transformers. In other words the whole auxiliary circuit may be corrected to unity power factor so that the apparent impedance inserted in the main supply leads becomes an equivalent ohmic resistance. The equivalent impedance drop per phase at the rotary converter collector rings consists mainly of the energy component due to the generator field resistance. Upon the assumed speed, reduction of the generator to one-half, this drop, as has already been shown, falls to one-half. The auxiliary circuit impedance contains a reactive component, however, which falls to one-quarter of its former value. This reactive component is reduced by one-half on account of the reduction in current to one-half and is again reduced by one-half, on account of the reduction in frequency, to one-half. Considering the compensating component of counter-electromotive force generated in the rotary windings by a compensating decrement of the rotary excitation, it will be seen that this compensating component changes to one-half on account of the reduction in the speed of rotation to one-half and again to one-half on account of the reduction in the current furnishing the series excitation. The proportionality of the latter factor is only approximate depending as it does upon the magnetization curve of the rotary converter field. Since both the reactive component of the impedance drop and the corrective factor of the field adjustment reduce in approximate proportionality, it is evident that any desired adjustment is approximately maintained independent of changes of current or speed.

While my invention in its broadest aspect is not limited to an arrangement in which the rotary converter is driven by a rigid mechanical coupling to the main generator, since the rotary may be freely running or driven by a synchronous motor, it is obvious that the double coupling of the rotary to the main generator mechanically through the positive drive and electrically through the current transformer and collector rings, results in an axis of magnetization polarity in the rotary converter armature which is stationary in space for any given condition. The mechanical coupling must be so adjusted that this magnetic axis necessarily adopts the correct position relatively to the stationary field poles of the rotary. This adjustment determines the phase angle of compensating voltage which the field of the rotary can insert in the auxiliary electrical circuit while the value of the field current determines its magnitude. The mechanical coupling of the converter to the rotatable element of the generator enables a further automatic variation of the generator excitation to be obtained. The position of the points of maximum potential on the commutator of the rotary with respect to the brushes 8 of the rotary will vary to some extent upon variations in power factor of the main line. This variation takes place notwithstanding the rigid coupling of the converter to the rotatable element of the generator because of the fact that the inducing field of the generator does not bear a fixed relationship in space to the rotating field element but depends upon the power factor of the load. For example, for one condition of load a position of the brushes relative to the points of maximum potential might be selected such that the movement of these points of maximum potential with varying load would readjust the excitation in such a way as to compensate for the cause.

A mechanical coupling between the generator and rotary converter presents the further advantage that no special starting means are required for setting the rotary converter into operation.

Where the total excitation is furnished by means of a rotary converter the reserve capacity for overloads is increased since the same active material can be used more effectively in a rotary converter than in a direct current generator and the temporary overload capacity is also large. Certain operating conditions, however, may make it preferable to provide the minimum excitation in the usual way by a direct current generator, in which case, I obtain the necessary regulation by adjustment of supplementary excitation provided by a rotary converter. Several modifications embodying this form of my invention will now be described.

In Fig. 2 the turbine, generator, motor and current transformers are arranged and connected as in Fig. 1. An exciter 17 having an adjustable shunt field winding 17′ is connected to the slip rings 9 for the generator field winding. The alternating current slip rings 12′ of the rotary converter 7′ are connected in series relation between the generator 2 and motor 4 by means of the current transformers 13. The armature of the converter 7′ is positively driven from the generator 2 by suitable means indicated as beveled gearing 18. The rotary converter is provided with a separately excited field winding 19 and with a cumulatively wound compounding winding 20 in series relation with the main generator field circuit. The direct current brushes 8′ of the rotary are arranged to supply an auxiliary winding 21 on the field of exciter 17 which winding is arranged to assist the shunt winding 17′. If desired any well known form of phase adjusting transformer 22 may be provided between the current transformers 13 and the alternating current end of the rotary 7′ to provide additional means for adjusting the voltage at the direct current brushes of the rotary converter. The regulating characteristic of the rotary converter must in this arrangement be made steeper than the regulating characteristic of the rotary converter in the arrangement shown in Fig. 1 since the rotary supplies but a part of the excitation. For example, a 10% increase of main current requires a 10% increase of total excitation for the generator, but since this total increase of excitation must be obtained as a percentage increase on the supplementary excitation and the latter is, for example, but 20% of the whole, then the necessary variation of the supplementary excitation amounts to 50%. This difficulty can be partly overcome by compounding the exciter which is, therefore, provided with a cumulative series field winding 23 so that any increase of field current due to the regulating device is reinforced by a corresponding increase in the compounding field. The operation of the system of Fig. 2 is believed to be obvious without further explanation in view of the detailed description of the regulating action given in connection with the modification shown in Fig. 1.

As an alternative to the arrangement shown in Fig. 2 the regulating rotary converter may be connected as a booster in the main exciting circuit. This modification is shown in Figs. 3 and 4.

Referring to Fig. 3 the turbine, generator, motor and current transformers are arranged as in the system shown in Fig. 1. The direct current mains 24 represent any convenient source of direct current excitation. The direct current end of the rotary converter 7″ is connected in series with the generator field winding. The alternating current end of the rotary is connected to be supplied from the current transformers 13. The rotary converter is in this modification shown as mounted on the shaft of the generator 2. Such arrangement may be satisfactory with fairly low speed prime movers but it will undersirable for high speed turbines, in view of the high commutator speeds involved. The rotary converter is provided with a separately excited field winding 25 and a cumulative series compounding winding 26. In this arrangement the electromotive force at the direct current brushes of the rotary converter is added directly to the electromotive force supplied from the direct current mains 24 and variations in the voltage at the direct current brushes of the rotary therefore regulate the exciting current of the main generator field winding.

The operation of the modification shown in Fig. 3 is similar to the operation set forth in connection with the description of the modification shown in Fig. 1. As in the case of Fig. 1, the automatic readjustment of the generator field current continues until the necessary value of the field current is obtained. While in this case the booster is furnishing but a part of the total power for the generator excitation, the capacity of the booster to regulate is not limited to a proportionally small range since the booster voltage continues to build up until the necessary regulation is secured. While a greater percentage increase in the voltage of the rotary converter is required than in the case of Fig. 1, the only limits to the regulating capacity of the booster are those imposed by saturation of the magnetic material, and since this machine is comparatively small it may be liberally designed. Since the field of the rotary increases in strength as its output increases, the commutating conditions are favorable to overloading.

Figure 4:
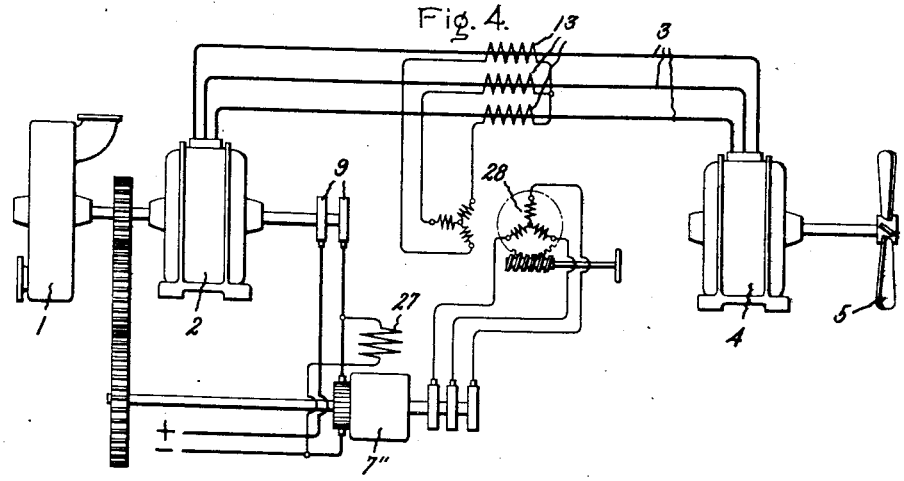

Referring to Fig. 4, the rotary converter 7″ is shown geared to the shaft of the generator as in the arrangement shown in Fig. 1 and is connected as a series booster as in the arrangement shown in Fig. 3. The converter is shown in this case with merely a separately excited shunt winding 27, the series winding being omitted. The necessary compounding may be obtained by proper phase adjustment of the phase adjusting transformer 28. It is obvious, however, that it will generally be preferable to use a series compounding winding for automatic regulation of the converter whether or not a phase adjusting transformer is provided for additional regulation.

What I claim as new and desire to secure by Letters Patent of the United States, is:

1. An electric ship propulsion system wherein a synchronous generator is arranged to supply current to an alternating current propeller driving motor and wherein means are provided for varying the speed of the generator to vary the speed of the ship, characterized by the fact that a rotary converter is provided to control the excitation of said generator arranged with its alternating current end in series relation with the circuit between said generator and motor.

2. An electric ship propulsion system comprising a propeller, a motor for driving said propeller at different speeds, a generator arranged to supply current of variable frequency for controlling the speed of said motor, a rotary converter provided with a separately excited shunt winding for controlling the excitation of said generator and current transformers for connecting the alternating current end of said rotary converter in series relation between said generator and motor.

3. An electric power system comprising a synchronous generator, an alternating current work motor, arranged to drive a load which varies at a greater rate than the speed, means whereby the speed of said generator may be controlled to control the speed of said motor, a rotary converter for controlling the excitation of said generator, current transformers for connecting the alternating end of said rotary converter in series relation between said generator and motor and means for driving said rotary converter so as to maintain a fixed speed and mechanical phase relationship between the rotatable elements of said generator and rotary converter.

4. An electric ship propulsion system comprising an adjustable speed synchronous generator, an alternating current propeller driving motor, a rotary converter for controlling the excitation of said generator, current transformers for connecting the alternating current end of said rotary converter in series relation between said generator and motor, said rotary converter being provided with a separately excited shunt winding and a cumulatively compound winding in series relation with the field circuit of said generator.

5. An electric ship propulsion system comprising an adjustable speed synchronous generator, an alternating current propeller driving motor, a rotary converter for controlling the excitation of said generator, current transformers for connecting the alternating current end of said rotary converter in series relation between said generator and motor, said rotary converter being provided with a separately excited shunt winding and a cumulatively compound winding in series relation with the field winding of said generator, and means for mechanically driving said rotary converter from said generator.

In witness whereof, I have hereunto set my hand this 22nd day of September, 1921.

CAMPBELL MACMILLAN.